May 8, 1956  J. B. LA ROCCA ET AL  2,744,562
APPARATUS FOR ASSEMBLING ADVERTISING DISPLAYS
Filed June 14, 1950  9 Sheets-Sheet 1
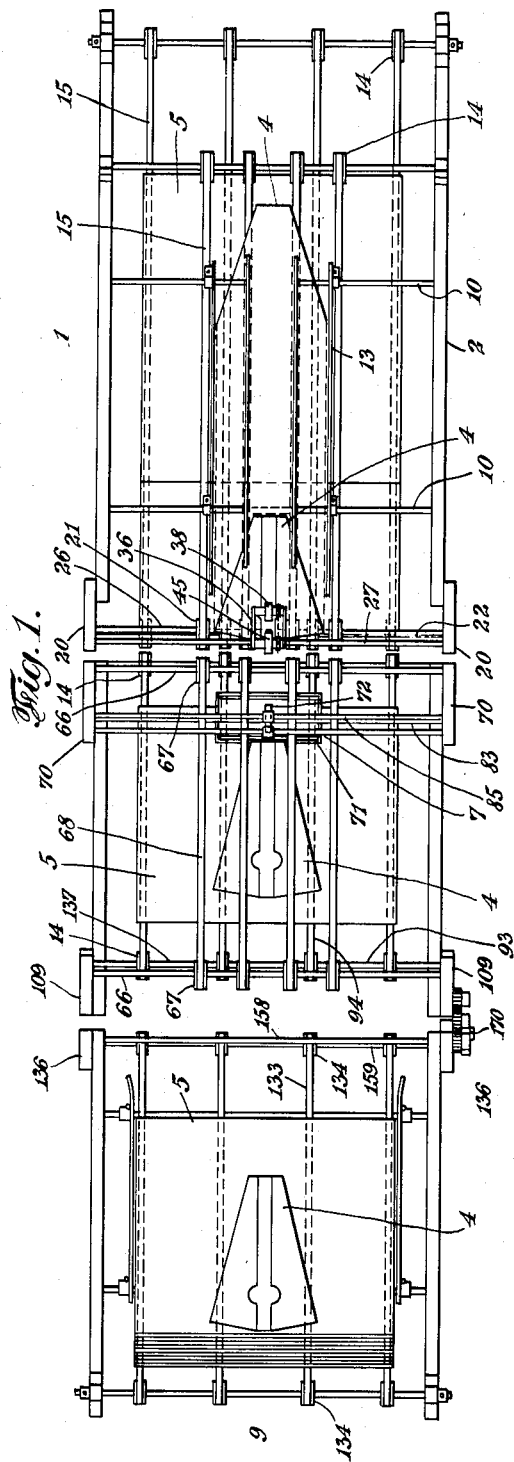
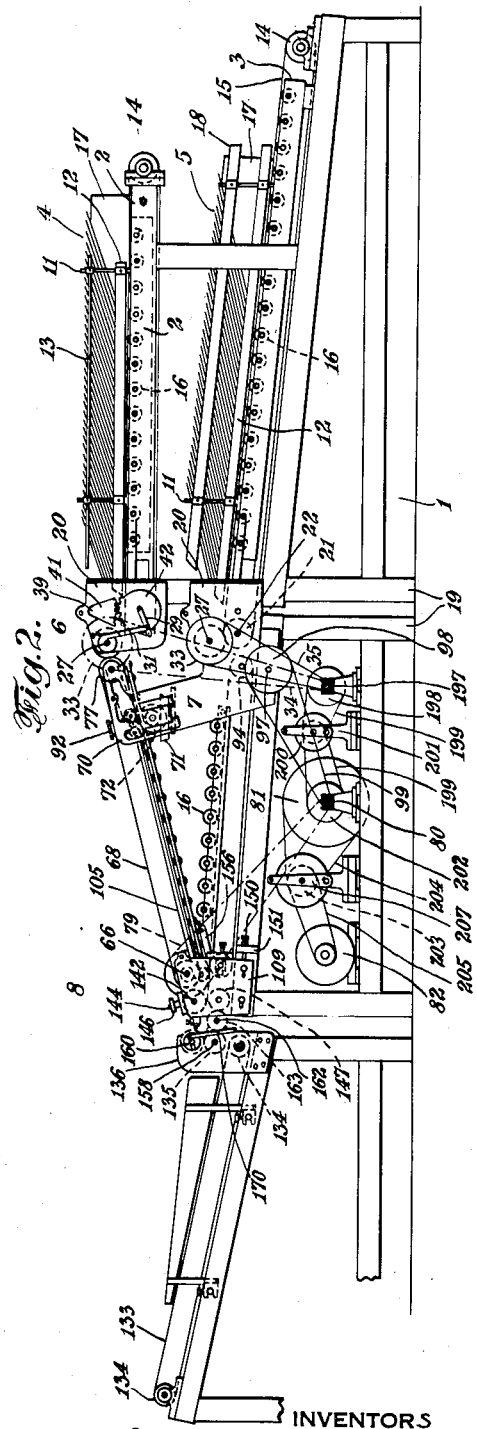
INVENTORS
JOHN B. LAROCCA
AND JAMES V. LAROCCA
BY
William F. Nickel
ATTORNEY May 8, 1956   J. B. LA ROCCA ET AL   2,744,562
APPARATUS FOR ASSEMBLING ADVERTISING DISPLAYS
Filed June 14, 1950   9 Sheets-Sheet 2
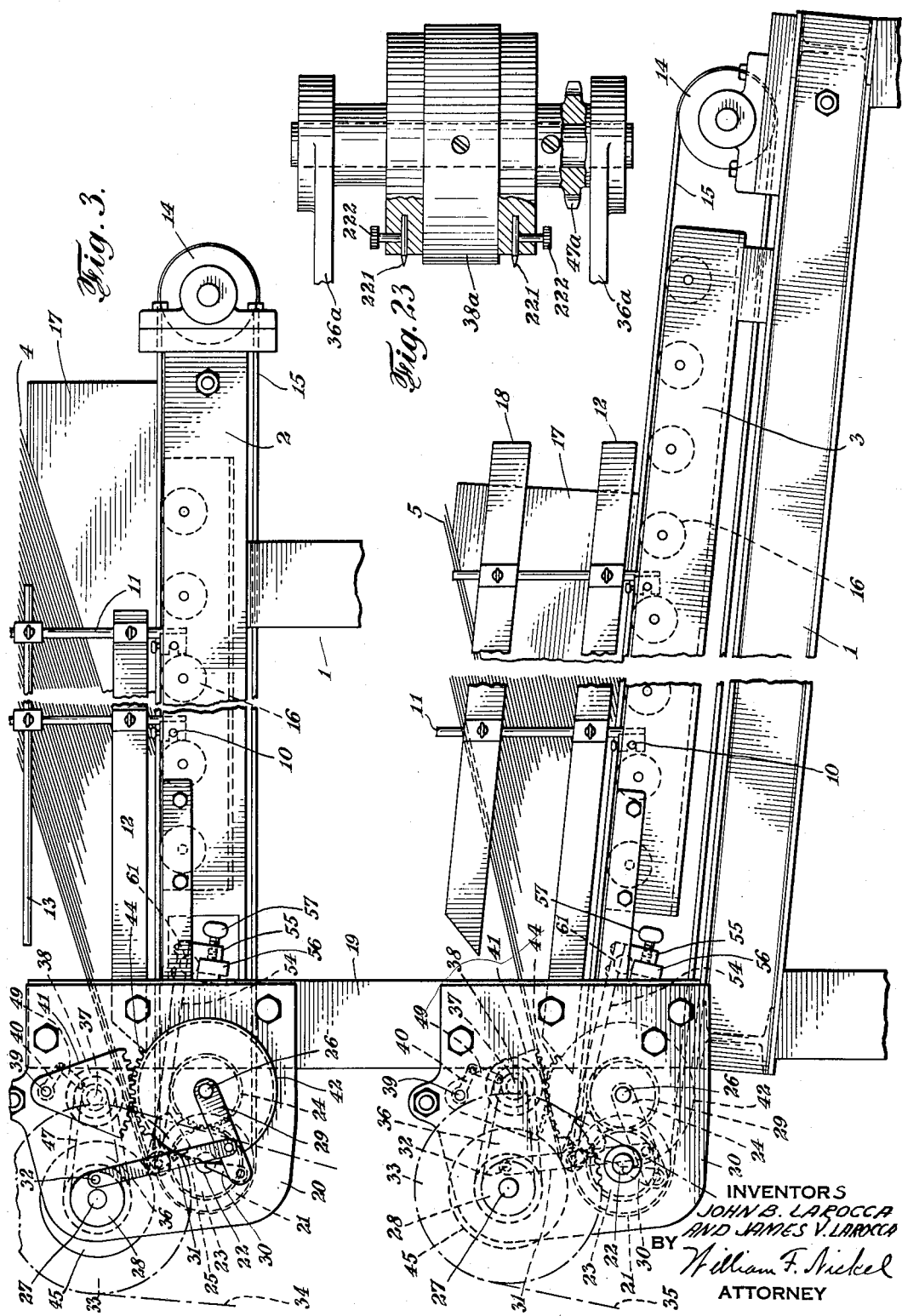
INVENTORS
JOHN B. LAROCCA
AND JAMES V. LAROCCA
BY William F. Nickel
ATTORNEY May 8, 1956　　J. B. LA ROCCA ET AL　　2,744,562
APPARATUS FOR ASSEMBLING ADVERTISING DISPLAYS
Filed June 14, 1950　　9 Sheets-Sheet 3
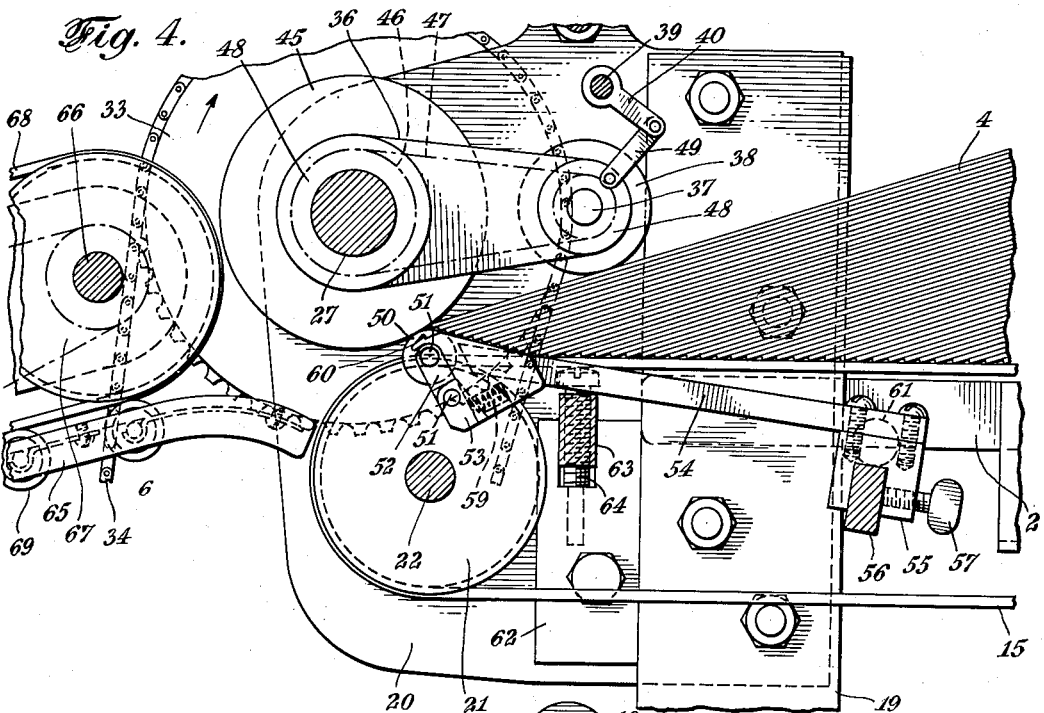
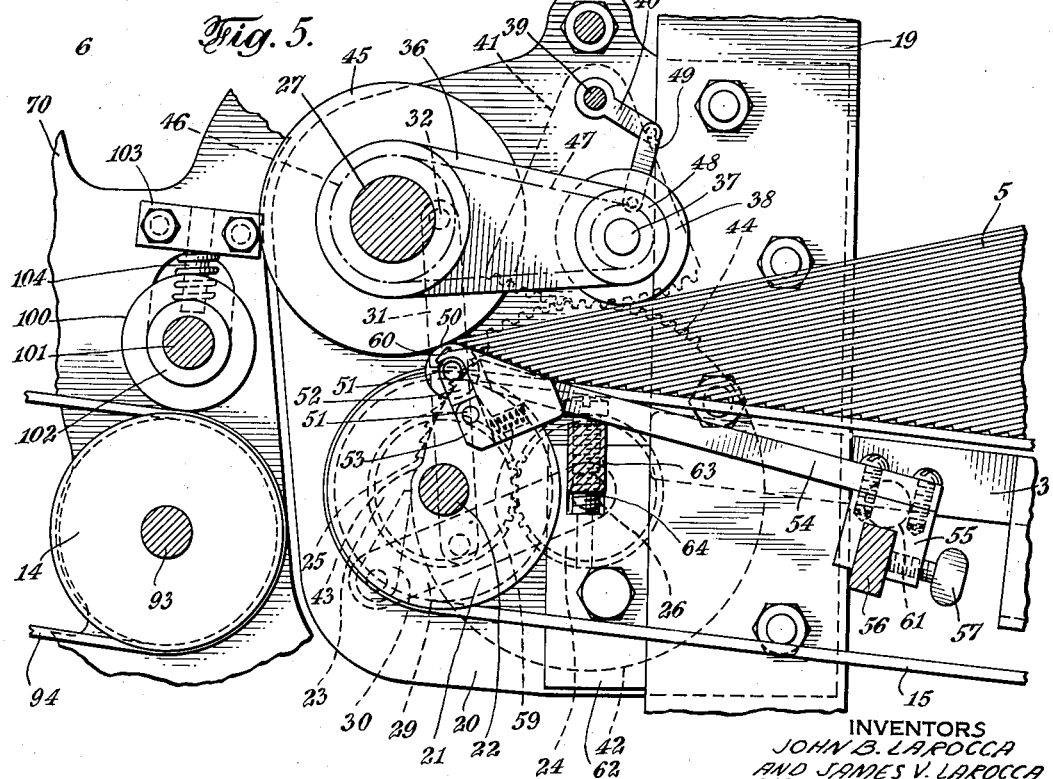
INVENTORS
JOHN B. LA ROCCA
AND JAMES V. LA ROCCA
BY
William F. Nickel
ATTORNEY

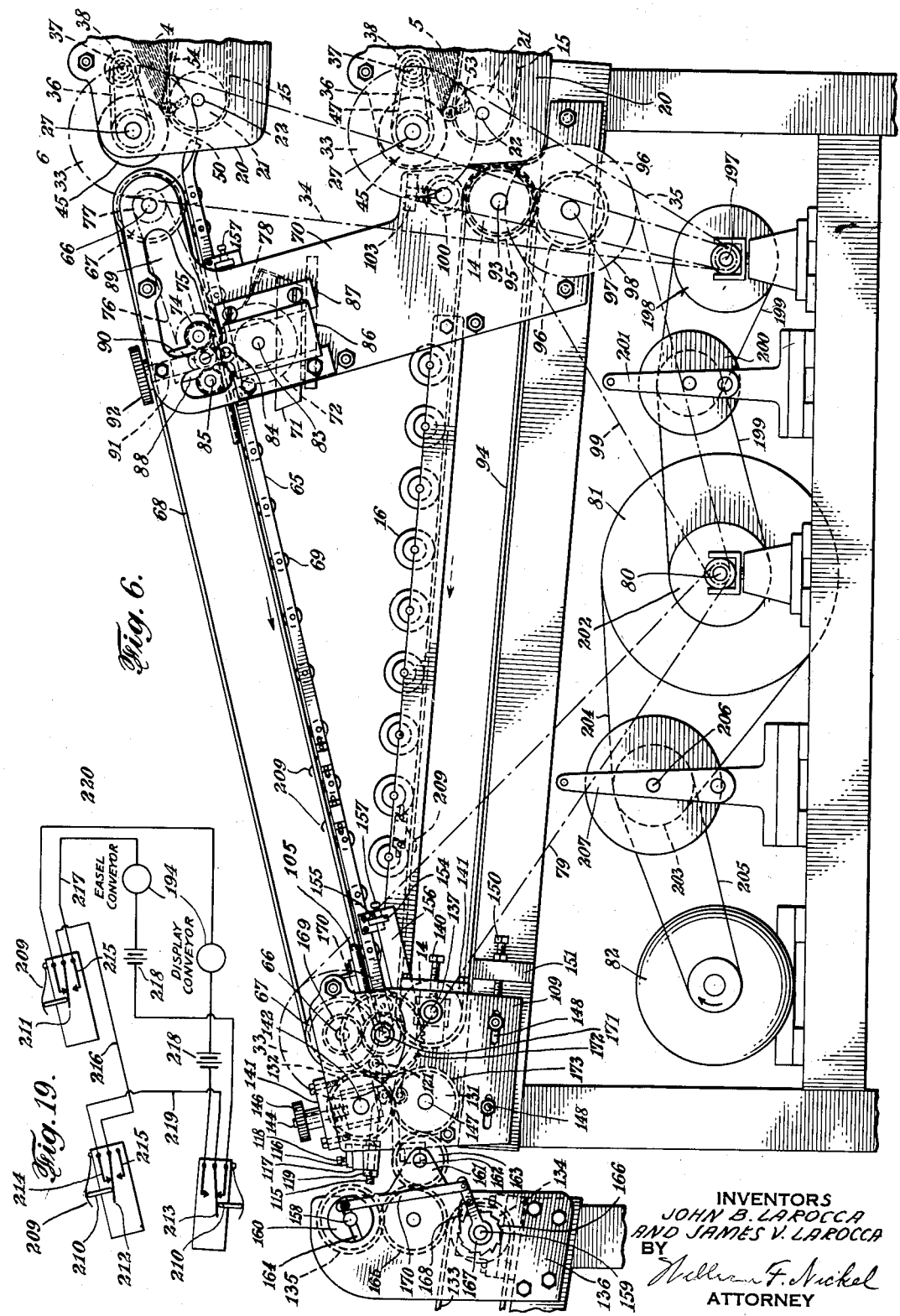

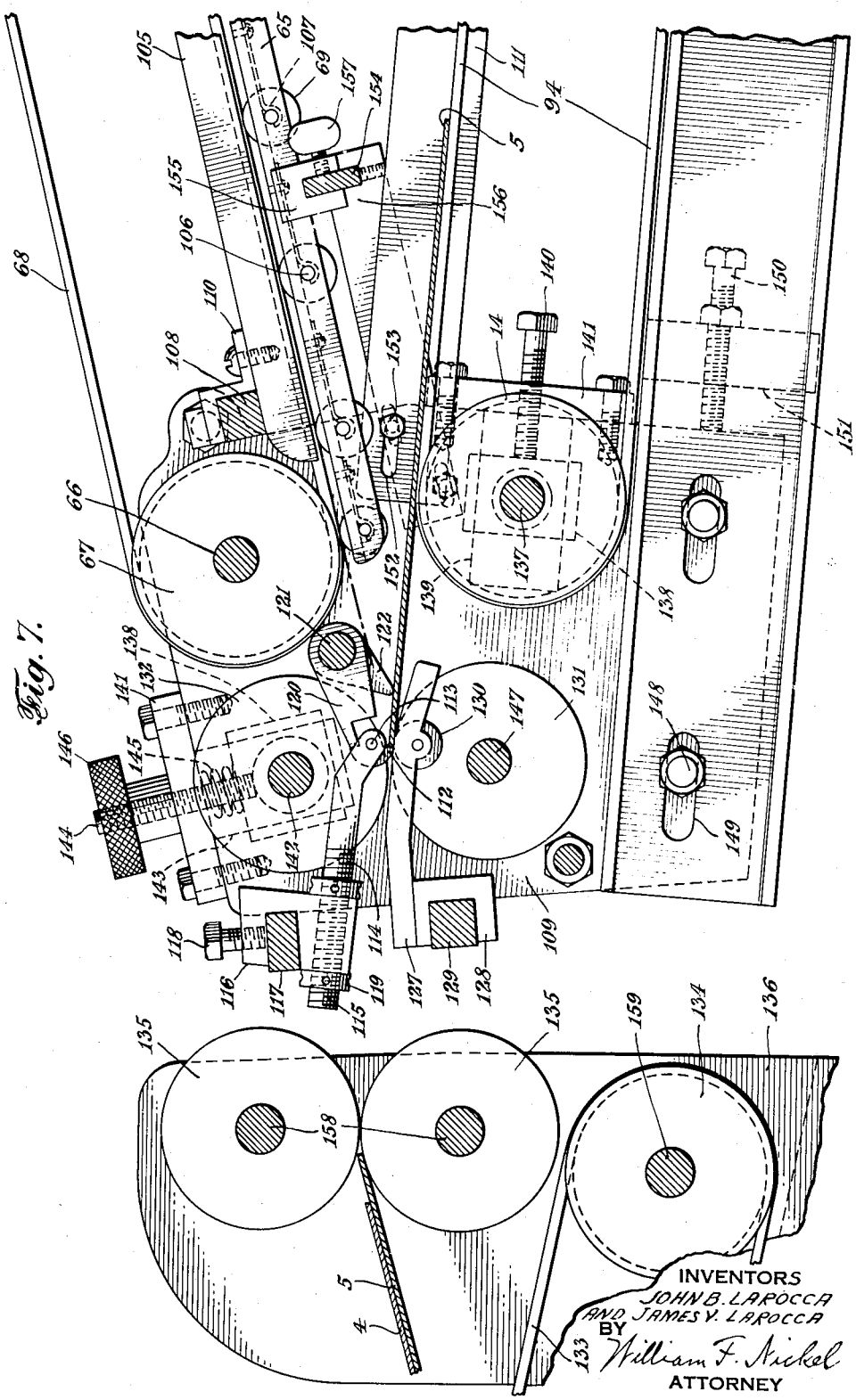

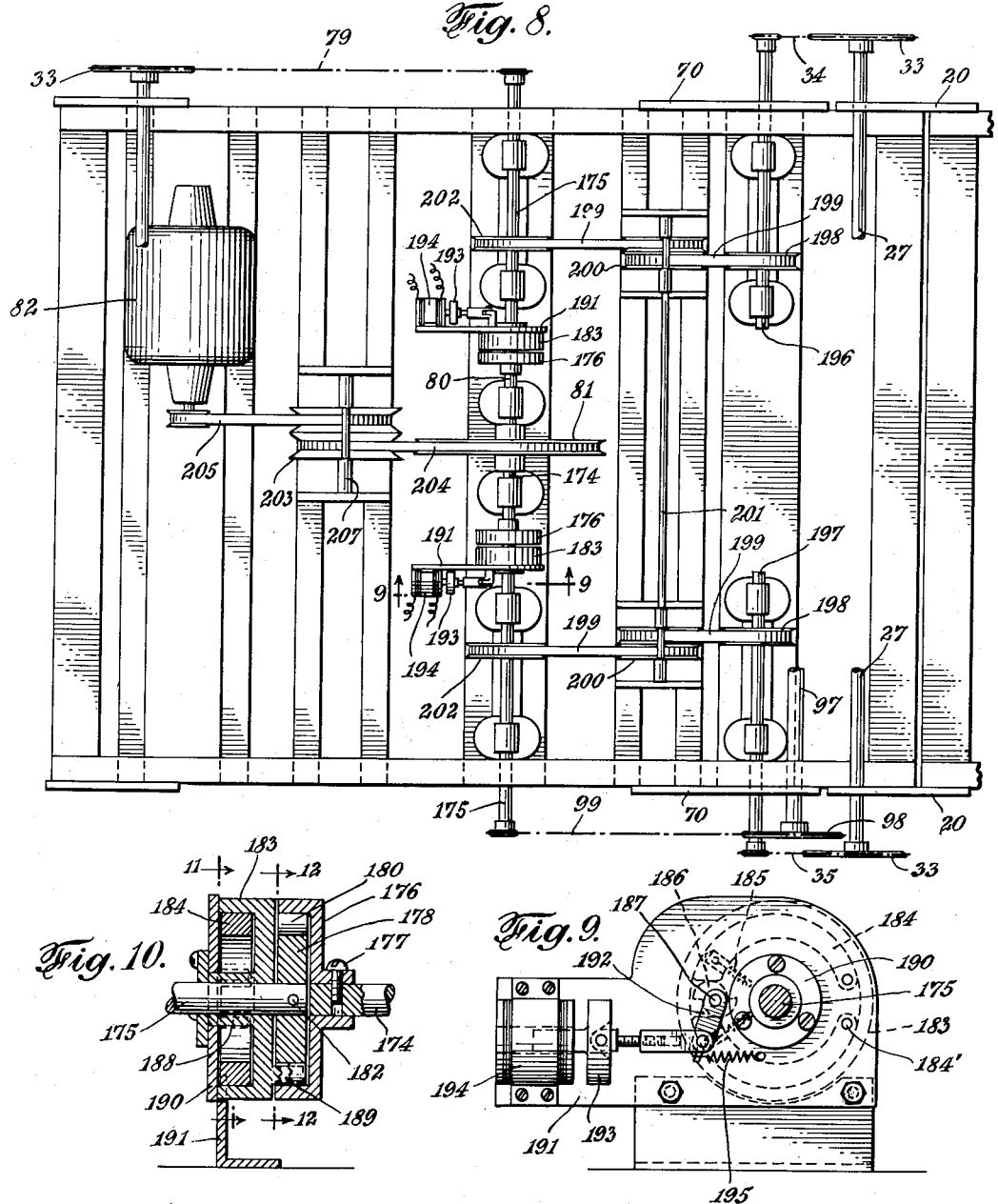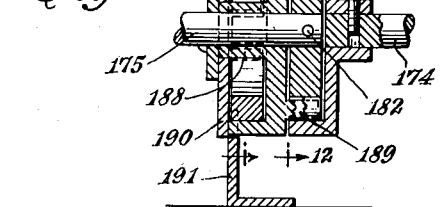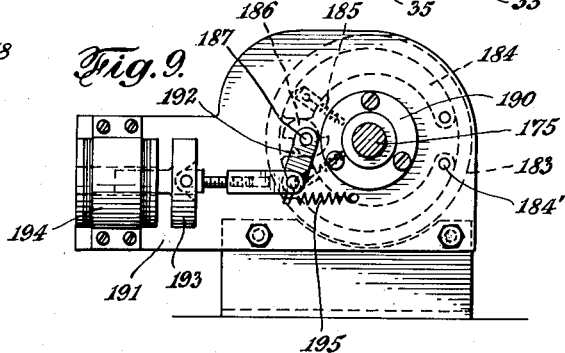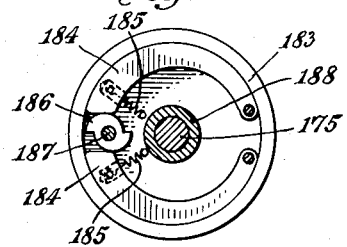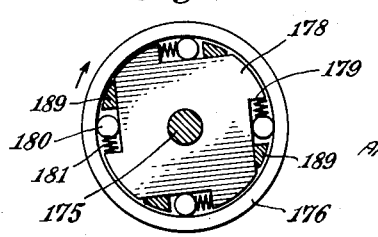
INVENTORS
JOHN B. LAROCCA
AND JAMES V. LAROCCA
BY
William F. Nickel
ATTORNEY May 8, 1956 J. B. LA ROCCA ET AL 2,744,562
APPARATUS FOR ASSEMBLING ADVERTISING DISPLAYS
Filed June 14, 1950 9 Sheets-Sheet 7
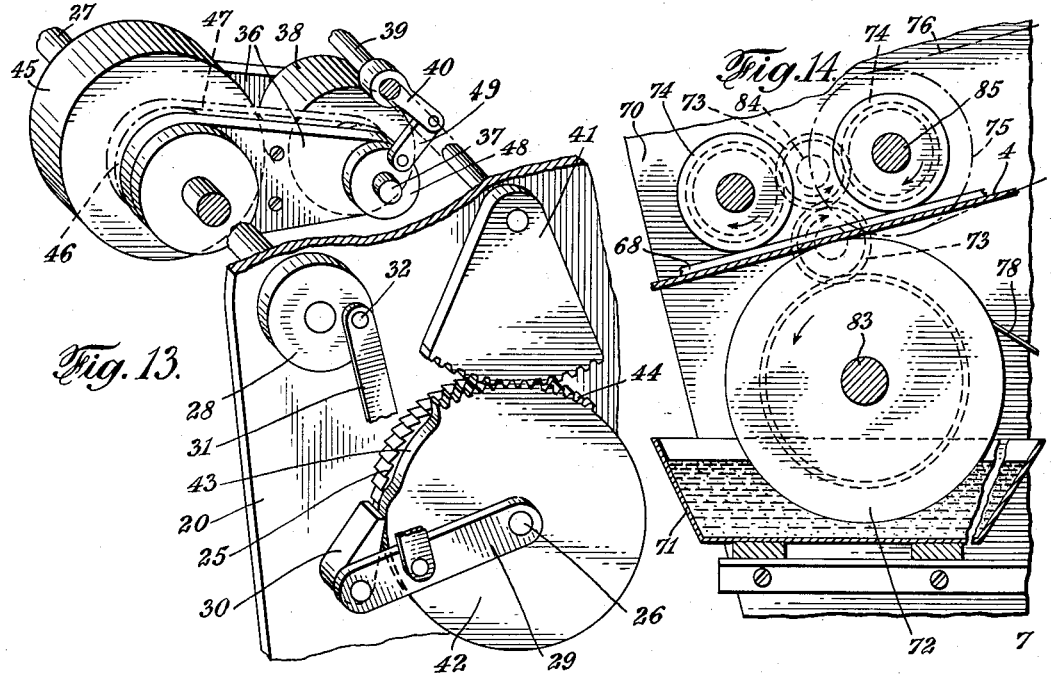
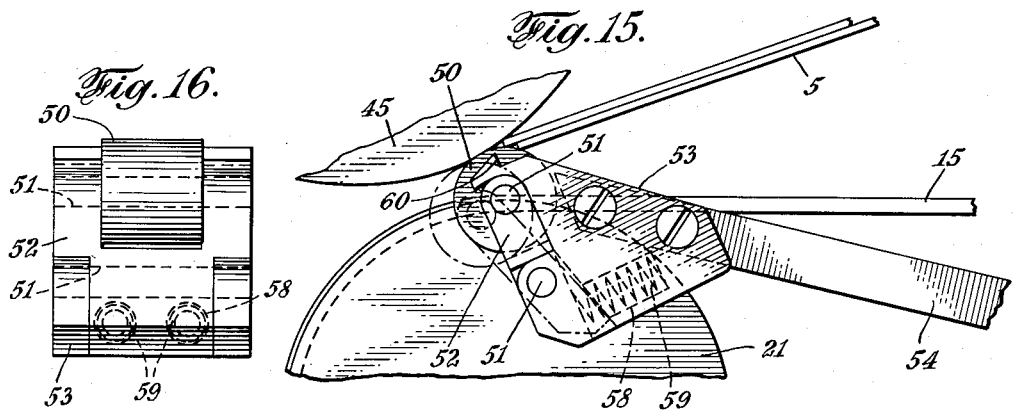
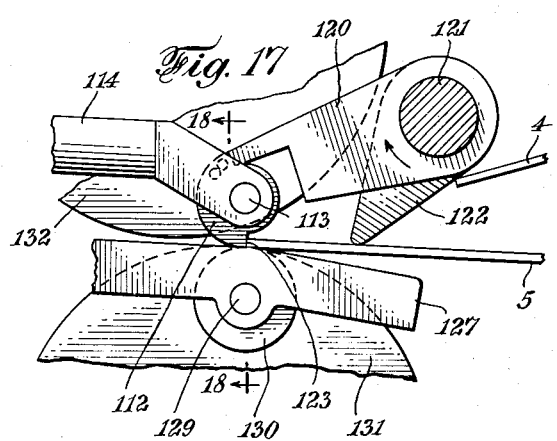
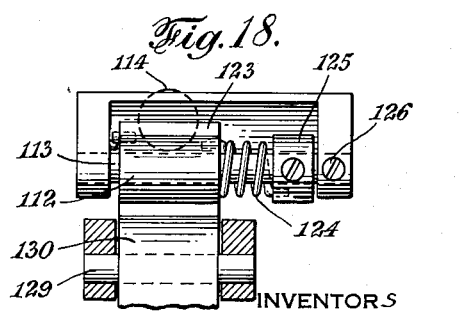
INVENTORS
JOHN B. LAROCCA
AND JAMES V. LAROCCA
BY
William F. Nickel
ATTORNEY May 8, 1956   J. B. LA ROCCA ET AL   2,744,562
APPARATUS FOR ASSEMBLING ADVERTISING DISPLAYS
Filed June 14, 1950   9 Sheets-Sheet 8
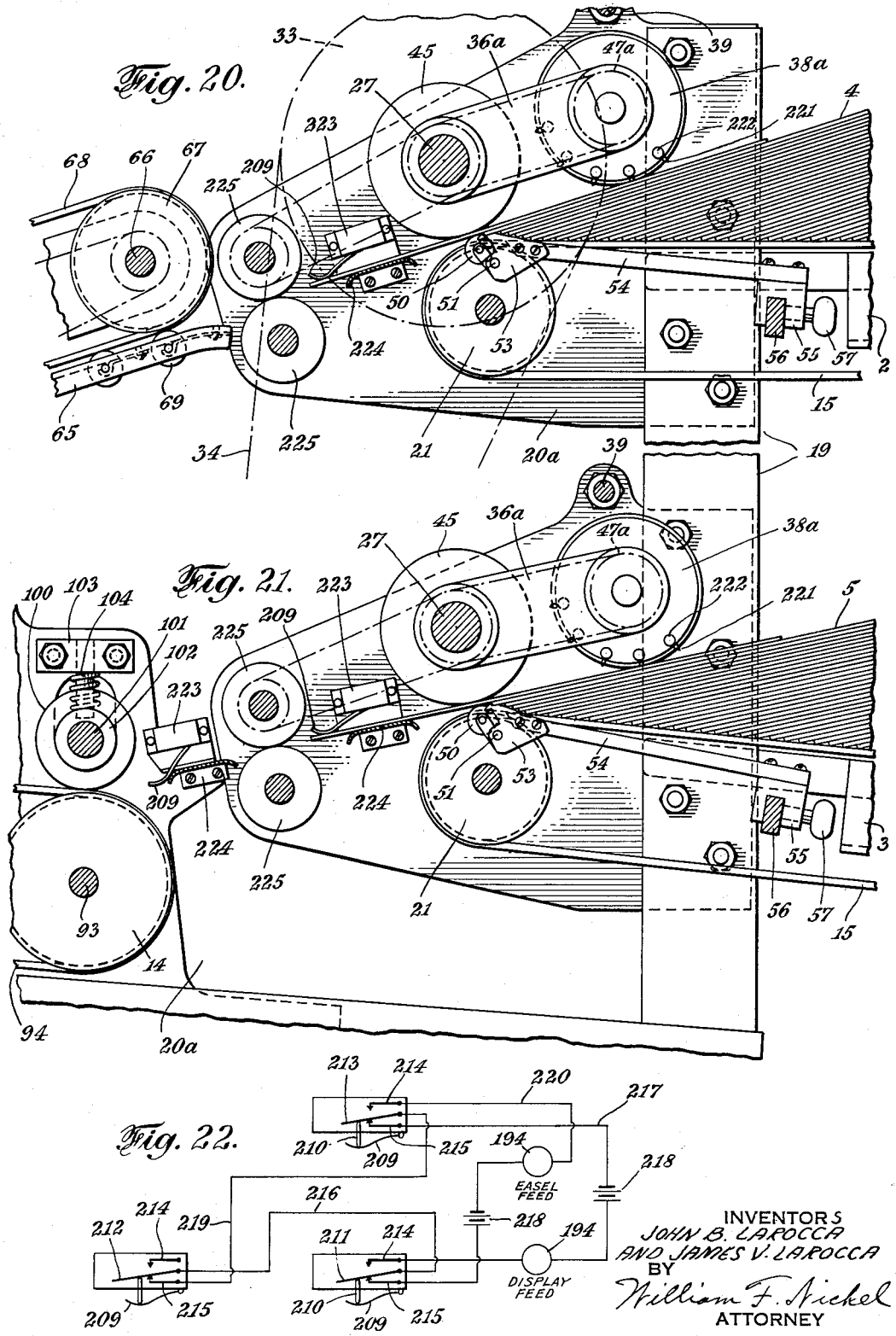

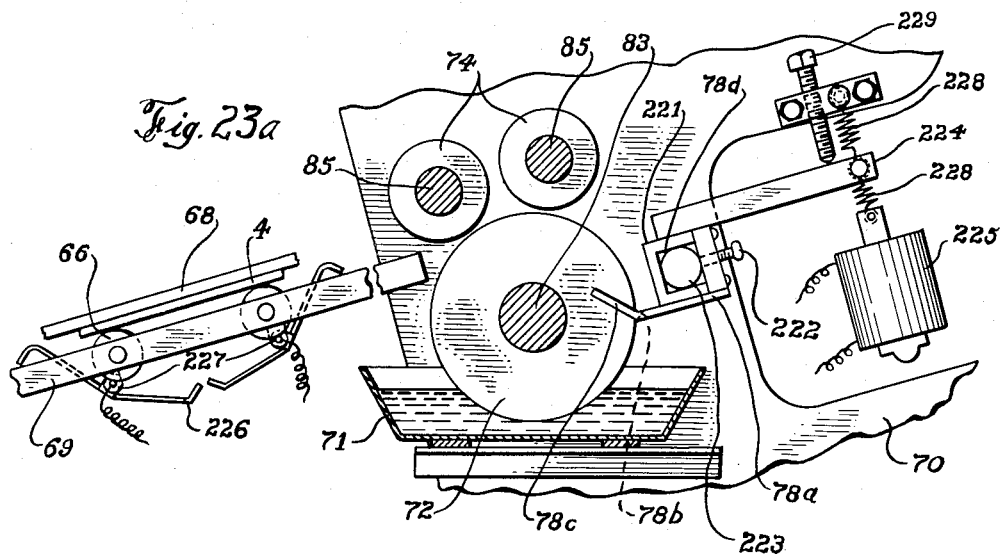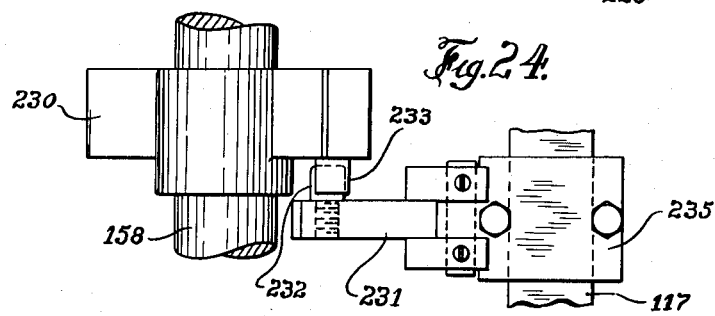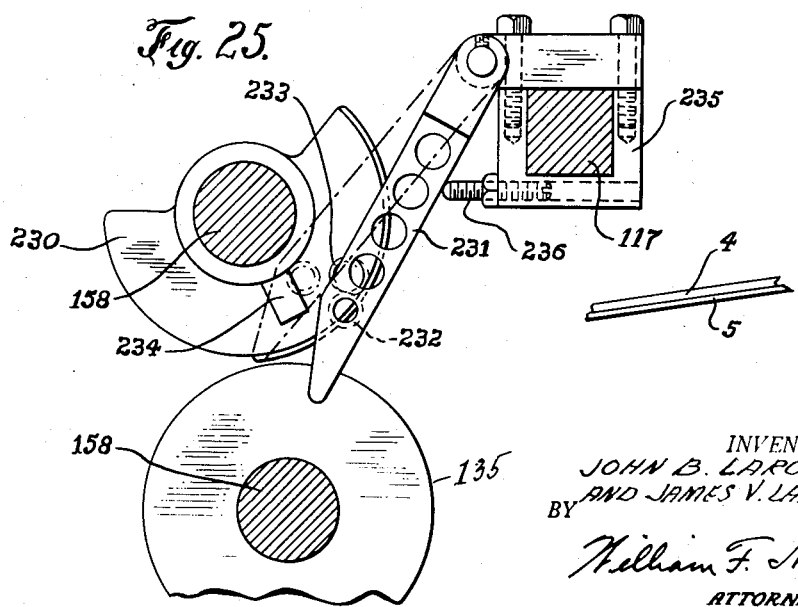

United States Patent Office 2,744,562
Patented May 8, 1956

2,744,562

APPARATUS FOR ASSEMBLING ADVERTISING DISPLAYS

John B. La Rocca, Valley Streams, and James V. La Rocca, Springfield Gardens, N. Y., assignors to Pioneer Mounting & Finishing Co., Inc., New York, N. Y., a corporation of New York Application June 14, 1950, Serial No. 167,954

8 Claims. (Cl. 154—1.6)

This invention is an improvement in assembling machines; and particularly apparatus for bringing together panel or display members, and props or legs therefor and permanently securing the props or legs to the display or panel members to make complete advertising units.

It is an important object of this invention to provide a machine which is built to receive said panels or legs, that are preferably of sheet material, such as cardboard, in stacks; and by which the display members and the props or legs are moved one by one into position and joined together; the machine having parts cooperating to feed a single panel and leg simultaneously to the point where the union of the two members is effected.

An additional object is to provide an apparatus of the type mentioned having mechanism which controls the motion of the panel members and the leg members so that they are impelled one of each at a time to the securing means.

A further object is to provide an assembling machine which contains speed regulating or synchronizing devices which cooperate in their action on the display members and the legs or the supporting members in such wise that each display member and its matching leg member come at the same instant into the position where they are permanently united.

In general the end to be gained by the invention is to connect the display and the leg members smoothly and rapidly, and to turn out the completed units in large quantities.

Another object is to provide an assembling machine which will move the display members and the supporting members along separate lines to the point of connection; and is equipped with stop devices acting, if either the display members or supporting members fail to move concurrently towards said point, to stop the transmission of the members in the other line till the proper operating conditions are re-established.

These and other objects and advantages are set out fully in the ensuing description and the novel features are defined in the claims. This disclosure, however, is explanatory only, and I do not wish to be restricted to the exact construction illustrated herein. The apparatus can be varied in numerous details without deviation from the main design in which the invention resides.

On the drawings:

Figure 1 is a top plan of the machine of this invention.

Figure 2 is a side elevation.

Figure 3 is a side elevation on an enlarged scale of the loaded end of the machine, with the mechanism for regulating the speed of transmission.

Figures 4 and 5 are side elevations on an enlarged scale of the devices by which the stock in the form of blanks is moved by the apparatus from the stacks into positions for the subsequent joining operations.

Figure 6 is a side elevation of the front half of the machine where the panels and the leg members are affixed to each other, and the driving means for the various parts.

Figure 7 is an elevation of the delivery end of the machine, on an enlarged scale.

Figure 8 is a top plan of the operating connections from the source of power for the machine.

Figure 9 is a section on the line 9—9 of Figure 8.

Figure 10 is a vertical section taken axially through what appears on Figure 9.

Figures 11 and 12 are respectively sections on the lines 11—11 and 12—12 of Figure 10.

Figure 13 is a perspective view of the controlling members which impel the supporting and panel members from the hoppers or stacks.

Figure 14 is a longitudinal section of a detail, showing the gluing device.

Figure 15 is a detail showing the arresting mechanism that prevents more than one member at a time from being taken from the stacks.

Figure 16 is a front view of what appears in Figure 15.

Figure 17 shows the parts for controlling the transmission of the panels and the legs so that they come together at the same instant.

Figure 18 is a section on line 18—18 of Figure of Figure 17.

Figure 19 is a diagrammatic view of the electrical control circuit which stops the motion of either the display or the leg members, if the others do not move in step therewith.

Figures 20 and 21 are side elevations of a modified design of the parts shown in Figures 4 and 5 respectively; and Figure 22 shows another layout for an electrical control circuit.

Figure 23a is a side view of an attachment for regulating the amount of adhesive laid on the easels or legs.

Figure 23 is a top view of part of said attachment.

Figure 24 is a top view of a stamping attachment; and

Figure 25 is a side view of said stamping attachment.

The supporting framework of the machine is indicated as a whole by the numeral 1. It comprises upper longitudinal beams 2 in horizontal positions at each side at the top, and below are inclined side beams 3. These side beams are all disposed adjacent one end of the machine and carry the means by which the stack of blanks is moved and fed into position to be operated upon as required. The leg members 4 are stacked above the beams 2 and the panel members 5 are stacked over the beams 3, as illustrated particularly in Figures 1 and 2. The legs or props and panels are impelled one by one by mechanism indicated as a whole at 6 Figure 2 from the stacks, given a quantity of adhesive from a vessel and coating means indicated at 7; and passed through pressure rollers at a point 8 to cause the leg members and panels to stick to each other. The completed units are finally discharged at the delivery section of the machine indicated at 9. The units are piled up on a conveyor there and removed by one of the attendants.

The side beams 2 are suitably supported upon uprights and the beams 3 upon other side beams below the latter, all being part of the framework 1. The beams 2 are connected by cross bars 10 and the beams 3 are joined by similar cross bars, and from each beam 2 and 3 rise posts 11 between which the legs 4 and panel members 5 are movably disposed. The lower ends of the posts 11 on beams 2 are connected by longitudinal guide bars 12 and at the upper ends of the same posts 11 are rods 13. Between the beams 2 and 3 are conveyors 15 that run both above and below the cross rods 10, and the stacks of members 4 and 5 are placed on these conveyors 15. The conveyors are mounted at one end on idle rollers 14 borne by suitable cross shafts, and between the beams 2 and the beams 3 extend rods or spindles which carry rollers 16 to prevent the top sections of the conveyors 15 from sagging. At the rear of each stack is a block 17 loose on the conveyors, with a sloping front face holding the panel and leg members in inclined positions. The upper ends of the posts 11 for the lower beams 3 are joined by bars 18, and the lower ends of the other bars 12. The shafts carrying the rollers 14 may be turned with the rollers, or be stationary with the rollers freely rotatable thereon.

Between the guide bars 12—13 and 12—18 the blocks 17 and the stacks are urged towards the middle of the machine in a direction to the left, as indicated in Figures 1 and 2. At this part of the apparatus, the framework has two uprights 19 at each side. To each pair of uprights are affixed two plates 20, one above the other, and each at the level of one of the conveyors 15, as illustrated on an enlarged scale in Figures 3, 4 and 5. These plates support the operating rollers 21 for the front ends of the conveyors 15, these rollers being fixed on shafts 22 mounted at their ends in the plates 20. On each shaft 22 is a gear 23 which meshes with a gear 24 that is rigid with a ratchet wheel 25. Each gear 24 and ratchet 25 are fixed on a shaft 26 supported by the plates 20. Above each shaft 22, each plate 20 also supports a shaft 27 that carries a fixed crank disk 28. Loosely mounted on each shaft 26 is an arm 29 which is united to the crank disk 28 by a link 31. Each arm 29 carries a pawl 30 at its outer end in position to engage and actuate the ratchet disk 25, and the link 31 is connected to the disk 28 by the crank pin 32. See Figures 3, 4, 5 and 13.

On each shaft 27 is a gear wheel 33. The upper of the gears 33 is operated by a chain 34 and the lower by a similar chain 35, both chains being driven by power connections at the lower part of the framework, as illustrated on Figures 2 and 6. Each of the shafts 27 carries a pair of loosely mounted arms 36, the outer ends of which carry each a short rotatable shaft 37. On the shafts, between the arms 36 are rollers 38, one of the rollers resting on the front end of the stack of inclined panel members 5 and the other on the front end of the stack of leg members 4. In each pair of upper and lower plates 20 is a bearing for a rock shaft 39 having a crank 40. At one end adjacent the outer face of the plate 20 each shaft 39 carries a fixed segmental gear 41. Below each gear 41 is a disk 42 mounted on the shaft 26, overlying the ratchet 25, and having a recess 43 on its rim, and adjacent the recess 43 are teeth 44. Each shaft 27 carries a roller 45 between the arms 36 bearing roller 38, and the shafts 37 are turned by the shafts 27 by means of gears 46 on the shafts 27 and 37 and a belt or chain 47. The rollers 38 thus rest upon the forward ends of the leg members and panels, and as these rollers are turned, the members are pushed on one by one out of the stack which contains them. The rollers 38 and 45 are so mounted that they are rotated as the shafts 27 revolve.

The carrier belts 15 are moved by the chains 34 and 35 revolving the shafts 27. The crank disks 28 lift and lower the links 31, and the arms 29 and pawls 30 act upon the ratchet wheels 25. The shafts 26 are thus turned step by step to make the gears 24 thereon revolve the gears 23 on the shafts 22, which bear the forward pulleys 21 of the conveyor belts 15.

In contact with the lower face of each roller 45 is a small roller 50 supported on a pivot pin 51 in a yoke-shaped bearing 52, which is mounted on a similar pivot pin 51 in bearing projections at the front ends of the sides of a block 53. Arms 54 are rigidly attached by screws to this block and to the framework 1; the block preferably having recesses in the top for the ends of the bars 54. The opposite ends of the arms 54 are fixed to a block 55, which has a groove or channel in its lower face to fit upon a cross bar 56 affixed to the framework 1, and held to the arms 54 by binding screws 57. The block 53 has sockets 58 in which are springs 59 that press against the lower end of the bearing 52, and keep the roller 50 in contact with the roller 45. Hence the piece of stock must always pass between these two rollers. The end of the block 53 under the roller 45 has a transverse shoulder 60 on its upper face, and the upper edge of this shoulder is separated from the rim edge of the roller 50 just far enough for one member only to pass out between the rollers 45 and 50. When this takes place, the roller 50 yields as indicated in Figure 15, but the block 53 remains fixed, and the distance between the shoulder 60 and the rim of the roller 45 is constant. But the arms 54 and blocks 55 can be adjusted about trunnions indicated in Figures 4 and 5 at 61. This is accomplished by attaching blocks 62 to the inner faces of the plates 20, the uprights 19, or other parts of the framework 1; and mounting cross bars 63 by means of these blocks. The blocks preferably have recessed seats for the ends of the bars 63, which are under the arms 54. Bolts or screws 64 are carried in each ends of the bar 63, and rest on the bottoms of the seats in the blocks 62. By turning the screws 64 the bars 63 and arms 54 can be raised or lowered.

The discharge of legs or supports 4 (also called easels) and panels 5 by passage between the rollers 45 and 50 comes about because, as the conveyors move the legs and panels towards these rollers, the top leg 4 and panel 5 in each stack clears the shoulder 60 on the block 53 and pushes against the small roller 59, forcing the bearing 52 and roller 50 to yield and compressing the springs 59. The props or legs and panels can thus slip through between the rollers 45 and 50. But they do this one at a time for each, and in such positions that the legs overlie the panels in the right place for gluing. If the feed by either conveyor is too fast for the other, the stack which is moving too fast will push up slightly against its roller 38. This roller will then tend to be lifted, and the arms 36 will push upward on the links 49 to swing the crank 40 and turn the shaft 39 through a predetermined angle. The links 49 are connected by pivot pins to the cranks 40 and to fixed bosses 48 on one of each pair of arms 36. As a result, the segmental gear 41 will rotate the disk 42, which is loose on the shaft 26, swinging the recess 43 in the rim of the gear 42 away from the pawl 30. See Figure 13. Hence the pawl will engage a smaller number of teeth on the ratchet disk 25. The shaft 26 running too fast will thus be revolved through a smaller number of degrees and the gear 24 on that shaft 26 will move the gear 23 on the shaft 22 of the conveyor through a correspondingly smaller arc. The faster conveyor will then be slowed down. The two conveyors are thus kept at the speeds required. The shafts 22, 26 and 27 are supported at both their ends in the plates 20 at opposite sides of the machine, and extend from one to the other. The arms 36 with the rollers 38 and 45 are between the plates 20 and in line with the stacks; but the segmental gears 41, disks 42, ratchet wheesl 25, arms 29, ratchets 30, links 31 and crank disks 28 are on the outer faces of two of the plates 20. One set of these regulator parts is mounted on the outer face of one side plate for the stack of legs or "easels" 4, and is on the side presented to the observer in Figures 2 and 3, for example. The other set for the stack of panel members 5 is on the outer face of one of the lower plates 20, at the side of the machine that is turned away from the observer in Figure 3. The rods or shafts 39 can also extend fully across the framework, or terminate in bearings near the rollers 38.

In Figures 1 and 2, which are drawn to a relatively small scale, many of the parts cannot be shown in full. These two views illustrate rather the general arrangement of parts only.

Beginning at the upper plates 20 and extending towards the delivery end of the apparatus are the inclined beams 65, with ends which curve downward between the plates 20 as shown in Figures 4 and 6. Adjacent the upper shaft 27 is a parallel shaft 66 on which are mounted idler pulleys 67. At the opposite or lower ends of the beams 65 is a similar shaft 66, with pulleys 67, and on the pulleys 67 is an endless conveyor belt 68. The lower length of this belt is supported on rollers 69 in the framework, and the leg members 4 are pushed forward on the rollers 69 and under the belt 68. Near the upper end of the conveyor belt 68 are two posts 70, affixed to the sides of the framework to support the gluing apparatus which unites the separate legs and panels together. The upper shaft 66 is mounted in bearings on these posts, and supported in any suitable way; and between the posts is a receptacle 71 which is loaded with the adhesive. See Figure 14. The vessel 71 is below the conveyor 68 and in the receptacle; dipping into the adhesive is a roller 72 which makes contact with the under side of each leg member 4 that is moved past it. Above the roller 72 are two rollers 74, connected to turn with the roller 72 by friction or other gearing indicated at 73. The rollers 72 and 74 can have reduced rims or other portions in operative engagement with the gearing 73, and either toothed or friction gearing might be used. Concentric with one of the rollers 74 is a gear 75, connected by a belt or chain 76 with a gear 77 on the adjacent shaft 66. A fixed blade 78 bears on the roller 72 to scrape off the excess of glue or adhesive.

The conveyor 68 is operated from the lower end by a chain 79 on a gear 33 fixed to the shaft 66 at said end connected to a suitable gear on a shaft 80 at the bottom of the framework 1. The same shaft has a pulley or gear 81 which is connected to be rotated by a motor 82. As the conveyor 68 is moved to carry the leg members 4 past the gluing mechanism, the connections between the shaft 66 and the gear 75 imparts motion to the gears 73 and the gears on the rollers 72 and 74. The roller 72 is mounted on a shaft 83, the gears 73 on shafts 84 and the rollers 74 and their gears on shafts 85. The legs 4 are then supplied with adhesive along the middle of their lower surfaces.

The shaft 83 of the glue roll 72 is mounted in blocks 86 secured to strips 87 or in any feasible way to the posts 70. The blocks may have projections 88 at the tops carrying the shafts 84 of the rollers 73, and the upper ends of the posts 70 have openings 89. Also the rolls 74 are preferably mounted so that they are adjustable vertically to some extent. For this purpose they are supported by means of their shafts 85 in the arms of an inverted yoke-shaped part 90, which is between the posts, and is attached at its middle to a screw, which passes through an enlarged opening in a bridge 91 between the posts 70. On the upper end of the screw is a head 92, and by turning said head the yoke can be moved up and down slightly to vary the pressure of the rolls 74 on the conveyor 68 as the blank 4 passes along the under side of the conveyor and in contact with the roll 72. The conveyors as shown in Figure 1, are each made up of separated belts. The middle of the blank props 4 which receive the glue is always between said belts. The rollers 16 and 69 are only as wide as the belts, and so are the idle rollers 14 and the driving rolls, but the shafts for all the rollers can extend fully across the width of the framework 1.

Mounted in the lower parts of the posts 70 is an additional shaft 93 carrying pulleys 14 for one end of a conveyor 94 to receive the panels 5 out of the stack beneath the legs 4. On said shaft 93 is a gear 95 which meshes with a gear 96 on a shaft 97 in the framework 1. Fixed to the same shaft 96 is a gear 98 connected by a chain 99 to the shaft 80. Above the rollers 14 is a presser roll 100, mounted on a shaft 101 in bearing 102 in the posts 70 at each side of the framework. Above each end of the shaft 101 is a bearing 103 in which is a vertical stud 104 surrounded by a spring which presses down on the bearings for the shaft 101. Each panel member 5 delivered from the stack passing between the rollers 45 and 50 is pushed between the roller 100 and the conveyor 94 under it and moved along the top of the afore-said other conveyor 94 beneath the conveyor 68 to the mechanism indicated at 8 where two members are pressed together and united by the glue on the leg member or easel 4. Rollers 16 as before press on the upper section of this conveyor 94, and the panels or display members 5 go under these rollers.

The framework 1 adjacent the pressure rollers has guides 105 of suitable length along the lower reach of the conveyor 68; see Figure 7; and the side beams 65 have flexible supports 107 for the trunnions or shafts 106 of the rollers 69 under the lower reach of this conveyor. The guides 105 are secured at their lower forward ends to a cross bar 108, supported at its ends by plates 109 at the sides of the framework 1 adjacent the lower end of the conveyor 68. To the bar 108 the guides 105 are attached by screws and brackets 110. The top of the conveyor 94 below the conveyor 68 at this part of the machine has guides 111 at the sides; and the guides 111 of course extend a little below the level of the stock on the conveyor 94.

At the forward end of the framework 1, where the final delivery section 9 begins, there is an arresting dog 112 mounted on a pivot pin 113 fixed to the end of a stud 114. See Figures 7, 17 and 18. The opposite end of the stud 114 is threaded as shown at 115 in Figure 7, and is screwed into a block 116 affixed to a cross bar 117 on the framework by binding screws 118. Nuts 119 on the stud 114 hold the stud in adjusted position. This dog cooperates with a pawl 120 fixed on a cross shaft 121 which carries a second fixed dog 122 that normally extends down into the path of a leg member 4. The shaft 121 is at the end of the conveyor 68, a bit lower than the shaft 66. The dog 112 is approximately semi-circular in shape with shoulders 123 at both ends. The pivot pin 113 is encircled by a spring 124 fixed to the dog 112 at one end and at the other to a collar 125 fast on this pin. The end of the stud 114 is yoke-shaped to mount the ends of the pin 113, which is held against rotation by a binding screw 126. The dog 112 arrests each panel member 5 till the leg member 4 arrives and lifts the dog 122. The two members are then in correct positions for being glued together.

Under the dog 112 are arms or plates 127 mounted on a recessed block 128 affixed to another cross bar 129 mounted on the side plates 109. The free ends of each arm 127 supports one or more rollers 130 under the dog 112, and the arm may have one or more slots in which each roller is located. Under the dog 112 is a large roller 131 and above this roller is a similar roller 132, the two rollers being designed to press the legs and panel members together till they stick fast to each other. The complete units each consisting of one panel and one leg, are then transferred to the delivery conveyor 133 which is mounted on rollers 134 at each end, passing thereto between rollers 135 in line with the rollers 131 and 132, and drop therefrom upon the conveyor 133. The rollers 134 and 135 are supported between side plates 136.

If desired two sets of dogs 112 with pawl 120 and dog 122 can be used, one on each side of the rollers 131 and 132 which are only as thick as the glue roll 72. The glue is put along the middle of the lower side of each leg or prop 4, which has the general shape presented in Figure 1 at the left. The rollers 131 and 132 press upon the members 4 along the middle to unite them to the members 5.

The front end of the conveyor 94 below the conveyor 68 is mounted on pulleys 14 affixed to a cross shaft 137 that is mounted in sliding bearing blocks 138, fitted in slots 139 in the plates 109 and engaged by bolts 140 in fixed bars 141 that close the ends of the slots 139. The tension of the belts of the conveyor 94 can thus be controlled. Also the pressure of rollers 131 and 132 on the panels 5 and legs 4 passing between them can be controlled by similar bearing blocks 138 for the ends of the shaft 142 of the roller 132. The plates 109 have upright slots 143 for these blocks, closed at the top by similar bars 141, both of which are secured by bolts to the plates 109. The blocks 138 for the roller 132 have fixed threaded studs 144 screwed therein and extending through smooth holes in the bars 141, and a spring 145 surrounds each stud 144 under the adjacent bars 141. On the outer ends of the studs 144 are nuts 146. By turning the nuts the roller 132 can be set as desired. The roller 131 below the roller 132 is mounted on a similar shaft 147 supported at its ends by fixed bearings in the plates 109. The faces of these two rollers need only be approximately as wide as the face of the roller 72, and they are in line with the middle of the blanks 4 and 5.

Both plates 109 are adjustably attached to side beams of the framework by bolts and nuts 148 engaging slots 149 in said beams. Bolts 150 in cross bars, projections or lugs 151 of the framework 1 engage the edges of the plates 109 to move these plates to tighten both belts 68 and 94 together. The guides 111 also have slots 152 at the ends to connect these guides to the plates 109 by bolts 153. Adjacent the lower ends of the beams 65 is a cross bar 154, which fits into recessed blocks 155 secured to the lower edges of the bars 65. The blocks 155 are affixed to the bar 154 by binding screws 157 and the cross bar is rigidly connected to arms 156 attached to the plates 109 by the same bolts 153 entering similar slots 152 in the arms 156. The lower ends of the beams 65 are thus adjustably connected to the side plates 109 while at the upper ends the beams 65 are movably attached by connectors indicated at 157 (Figure 6) to the posts 70, so as to permit longitudinal shifting of the beams 65 and bars 156. The shafts for the rolls 135 above the delivery conveyor 153 are shown at 158 and for the rollers 134 of this conveyor are shown at 159.

On the outer face of one of the plates 136 the upper shaft 158 has a disk 160. See Figure 6. The plates 136 have projections 161 in which is mounted a shaft 162 carrying a gear 163. The disk 160 has a transverse slot 164 in its outer face and the shaft 159 of the lower roller 135 has a gear 165 thereon meshing with the gear 163 and rotated thereby. The lower shaft 159 has gear connection with the upper shaft 158 and turns it. The shaft 159 has a ratchet wheel 166 on the outer face of said plate 136, and loose on the outer end of the shaft 159 is an arm 167 carrying a pawl 168 to engage the ratchet. When the upper roller 135 turns it operates the link 170 to lift the arm 167 and actuate the ratchet and thus give intermittent movement to the conveyor 133. The link 170 is pinned in the slot 164.

The shaft 66 of the conveyor 68 has a gear 169 meshing with a gear 170 on the shaft 171 mounted in the plates 109. This gear 170 is rigid with a larger gear 172 on the shaft 171 that meshes with a gear 173 on the shaft 147 and the gear 173 engages and rotates the gear 163. Motion is thus transmitted from the conveyor 68 to the conveyor 133, but the former moves continuously and the latter step by step, because of the action of the link 170 and ratchet 166.

The shaft 80, from which motion is transmitted to the two conveyors 15 at the loading end of the machine, and the conveyor 68, also the conveyor 94 beneath it, comprises a section 174 in the middle bearing the large pulley 81, and a section 175 at each side of the pulley 81. See Figures 8 to 12. Each end of the middle section 174 is affixed to a flat cylindrical casing 176, being secured to the hub thereof by a binding screw 177. Enveloped by the rim of this casing is a flat head 178, with segmental recesses 179 in the circumferential edge, these recesses having abrupt shoulders at one end. In each recess is a roller 180, and a spring 181 engaging the shoulder and acting to force the roller away from it. The adjacent other shaft 175 is affixed to each head 178 by a pin 182. On the shaft 175 and close to the casing 176 is a casing 183 of the same shape with a rim and containing two brake shoes 184. These shoes are pivoted at one end and are on the inside of the casing and are curved to press against the rim thereof. The casing 183 has an inside hub 188, and between this hub 188 in the casing 183 and the free ends of the shoes 184 are springs which pull the brake shoes inward. Between the free ends of the shoes is a double cam 186 mounted on a short spindle 187 which projects from the front of the casing 183. On the back of the casing 183 are studs 189 which project into the recesses 179 of the head 178, in such position that the rollers 180 are between these studs 189 and the springs 181. The casing 183 is rotatable with the casing 176, and is closed at the front by a stationary plate 190, which is bolted to a plate 191 fixed to the framework 1. The pivot pins for the shoes 184 are affixed to the plate 190, to which the springs, 185, also are affixed.

The spindle 187 projects through the plate 190 and on its outer end is fixed arm 192, pinned to the armature 193 of the solenoid 194. The armature is pulled out by a spring 195 attached to the plate 190, and as long as the armature is not attracted the cam 186 has no effect on the brake shoes 184. But whenever the magnet 194 is energized, the plunger 193 is pulled in and the cam 186 spreads the brake shoes 184. So long as the solenoids are not activated, the shaft 174 rotates both the heads 178, which act on the rollers 180 in the same manner as the well-known ball bearing clutch for bicycles and the like. The heads 178 in turn rotate the shafts 175, and the casings 176 rotate the casings 183, to which they are connected by the studs 189 on the latter. But when one of the solenoids 194 receives current, the plunger 193 is pulled to make the cam 186 throw the brake shoes against the rim of the casing 183, retarding the latter. The studs 189 then force the rollers 180 back against the springs 181, so that the rollers 180 lose contact with the rim of the casing 176. The shaft 175 then stops.

Figure 8 illustrates the arrangement of the driving connections for the apparatus. Two transverse shafts 196 and 197, one at each side of the framework, have sprocket gears on their outer ends, and one is connected by a chain 34 to the upper shaft 27, and the other by the chain 35 to the lower shaft 27. Each shaft 196 and 197 bears a pulley 198 connected by belts 199 and pulleys 200, the latter each on a belt tightening frame 201, to a pulley 202 on one of the shafts 175. The pulley 81 on the shaft 80 is connected by pulleys 203 and belts 204 and 205 to a pulley wheel on the shaft of the motor 82. The pulleys 203 are mounted on a shaft 206 in a variable speed pulley frame 207. One of the shafts 175 has a sprocket carrying the chain 99 that rotates the parts 97 and 98 to actuate the conveyor 94.

The solenoids 194 are controlled by flexible switch operating members 209, two of which are mounted in line adjacent the lower section of the conveyor 68 and one adjacent the upper section of the conveyor 94. These members are in central position to be pressed down by the panels 5 and props or "easels" 4. These members press upon studs 210, which engage switch blades in circuit with the solenoid 194. In Figure 19, the particular conveyor 68 or 94 controlled by each of the solenoids, is indicated. The first member 209 in the line of movement of the legs 4 operates a switch blade 211 and the other a similar blade 212. The member 209 for the display panel conveyor holds its stud 210 in engagement with another movable switch blade 213. Each of the blades 211, 212, and 213 has a fixed contact 214 above it and a fixed contact 215 below it. The two switch blades 211 and 212 are joined by a wire 216. The lower terminal 215 for the switch blade 212 is disconnected while the lower terminal 215 for the blade 211 is joined by a wire 217 leading to the solenoid 194 for the "easel" or leg conveyor 68 and to a battery 218. The top fixed terminal 214 for the blade 212 is joined by a wire 219 to the blade 213, the fixed lower terminal for which is connected to the other pole of the aforesaid battery 218. The fixed upper terminal for the switch 213 runs to a second battery 218 and to the solenoid 194 for the display panel conveyor 94 under the conveyor 68. This solenoid is united by a wire 220 to the upper fixed terminal of the switch 211.

Normally, springs not shown keep the members 209 and the switches in the position shown in Figure 19. But when the legs 5 and panels 4 reach the members 209 they press on the members 209 and the studs 210 force the switch blades 211 and 212 against the lower fixed terminals 215 and the blade 213 against the terminal over it. In this position, the circuits of the solenoids 194 are open, and the two shafts 175 keep turning. All the four conveyors then keep moving. But if either of the conveyors 68 or 94 under it have not blanks upon it, the member 209 therefor will be released. The panel members 5 are longer than the leg or "easel" members 4, but each of the latter is glued upon one of the former with the front ends of the two in flush position. Suppose now no display member comes into place and the member 209 for the display panel conveyor 94 allows the switch blade 213 to drop into contact with the lower terminal 215; switch 212 rises as soon as the preceding leg leaves it with the preceding panel member, but the next leg member now brings about contact between the switch 211 and its lower contact 215. A circuit will now be closed through the solenoid for the conveyor 68, and the easel conveyor 68 will stop till another panel member 5 arrives on the conveyor 94 under it. Then both conveyors will resume motion. If the line of "easel" or leg members is interrupted, the easel conveyor switch 213 will be held in contact with the adjacent upper terminal 214, but the switches 211 and 212 will rise and a circuit will be completed through the solenoid for the panel member conveyor 94 to stop the line of the panel members till the leg members come again.

In Figures 20 to 23 inclusive, the rollers 38a associated with the rollers 45 are mounted in arms 36a on the shafts 27, and have pointed studs 221 held by screws 222 to feed the blanks forward. The rollers 38a are driven by chains connecting gears on the shafts 27 to gears 47a fixed to the rollers 38a. One member 209 is provided for the leg blanks in this modification, and two members 209 for the panel blanks, each mounted on bars 224 in the framework 1. At the outer ends of these upper and lower plates 20a are guide rolls 225, between which the legs and panels pass separately to the conveyors 94 and 68. The lower idle rolls 225 are between the flexible members 209 for the panels 5. In this case, all of the members 209 are pressed upward by the blanks, and under each member is a flat bar 224 to support the legs or "easels" and the panel members. The upper roller 225 of each pair is rotated by a chain or belt gear from the adjacent shaft 27. The studs 221 operate only long enough to push the blanks between the rollers 225.

The circuit layout is indicated in Figure 22. The two lower members 209 control the switch blades 211 and 212, and the upper member controls the blade 213. The switch blades 211 and 212 are joined by a wire 216. The top fixed contact 214 of the switch 212 is disconnected, but is engaged by the adjacent switch blade when the blanks are passing. The top contact 214 for the switch 213 is joined by a wire 220 to the solenoid for the easel conveyor 68 and to a battery 218 and to the lower contact 215 for the switch 211. The lower contact 215 of the switch 213 is united by wire 217 and battery 218a to the solenoid for the display panel conveyor 94 and to the upper contact for the switch 211; and the blade 213 is joined by a wire 219 to the lower contact 215 of the blade 212. So long as the blanks hold the switches up, neither of the solenoids is energized, but if a blank in either line fails to arrive in company with the other, the switch is released, and a circuit is established through the solenoid controlling the conveyor for the other line, which then stops till the first line again starts moving. If an easel arrives, the switch 213 is lifted to make contact with the terminal 214 and if there is no panel lifting the switches 211 and 212, a circuit is established through the solenoid for the conveyor 68 to stop the feed of the legs or easels 4. On the other hand if no leg 4 arrives to lift the blade 213, the member 5 on reaching the switch 211 pushes it up to make contact with the adjacent upper terminal 214. Then a circuit is established through the other solenoid to stop the conveyor 94 and the panels do not move till a leg arrives.

It is desirable in some kind of work to interrupt the strip of glue laid on the easels 4, or to shorten the length of the strip or layer of adhesive. For this purpose the construction of Figure 23a is employed. The finger or scraper 78a has an edge 78b which makes contact when required with the roller 72; this scraper having arms 78c which flank both faces of the roller 72. The scraper is attached to a frame 221 secured by a binding screw 222 upon a bar or rod 223, parallel with the axis of the roller 72, and mounted to rock in bearings on the main frame 1. This bar carries a rigid arm 224, which is pulled down by a solenoid 225 to bring the edge 78b of the scraper into engagement with the roller 72 when the solenoid is energized.

On the parts 69 which support the conveyor 68 are two switch members 226, pivotally attached to downward projecting lugs 227 on the parts 69. The lower ends of these members 226 are bent to make contact with each other, and the upper ends extend up towards the conveyor 68 and are curved over and downward. When a unit comprising an easel in passing depresses the upper ends of the switch members 226, the lower ends engage and complete a circuit through the solenoid 225 and the scraper removes the adhesive from the rim of the roll 72 till the circuit is broken. The plunger of the solenoid is joined to the bar 224 by a spring 228 and a similar spring joins the arm 224 to a fixed part of the frame of the machine. A screw 229 on the frame engages the arm and adjusts it into desired position. Of course the switch members 226 are at the right distance apart, and in the required places on the parts 69, and can be adjustably connected to the framework.

Preferably the construction of the machine also includes a marking or stamping member, which prints upon the easels whatever notice the manufacturer wishes to attach to the product. This member is illustrated in Figures 24 and 25. It consists of a body 230 with a circular face, but it is only somewhat more than a semicircle in extent. It is loosely mounted on the upper shaft 158, and it bears type or the like on the curved face thereof. The upper shaft 158 carries some of the rollers 135, and the member 230 is in mid-position on this shaft, between adjacent rolls 135 thereon. The radius of the member 230 is slightly less than the radius of the rollers 135, so that in the position shown in Figure 25, the rim of the member 230 is slightly above the level of a line joining the tops of the lower rolls 135. But when an easel 4 joined to a panel 5 passes over the tops of the lower rollers 135 the easel will make frictional contact with the member 230 and cause it to turn on the shaft 158 bearing it.

The bar 117 above mentioned, adjacent the rollers 135 supports a pivoted arm 231, which extends down along one face or side of the member 230, and carries a stud 232 projecting at one side. This stud engages a stud 233 on the adjacent side of the member 230, and the two studs then act as stops to prevent rotation of the member 230. The member 230 will then hang in the position shown in Figure 25, balanced by its own weight. When, however, a unit consisting of a pane and an easel arrives, the front edge of this unit pushes the arm 231 upward, and disengages the stops 232 and 233. The frictional contact of the unit with the face of the member 230 bearing the printing characters will then rotate the member 230, till the notice is fully impressed on the unit. When this is done, the leading corner of the member 230 will have advanced beyond the vertical plane through the axis of the upper shaft 158, and will thus overweight itself and tend to drop back to starting position. If this occurs before the unit has passed the member 230, the printing will be repeated, but the arm 231 is still held up by the unit. Though the member may tend to move further in a clockwise direction on the upper shaft 158, another stop 234 on the side of the member will strike the stop 232 on the arm 231. The printing characters on the member 230 will thus be held out of further contact with the united easel and panel till these have passed the arm 231 and released it. The arm will then swing back to the full line position on Figure 25 and the member 230 will then swing down till the stops 233 and 232 again make contact. The member is then in position to print the next unit. The arm is mounted on the bar 117 by means of a frame 235, which bears a screw 236 to adjust the arm 231.

Having described my invention, what I believe to be new is:

1. Assembling apparatus comprising conveyors each for bearing a stack of blanks to be joined together, one by one from each stack, additional conveyors, one in line with each of the first-named conveyors, to receive the blanks from said stacks, gluing means adjacent one of the additional conveyors, pressing means adjacent the additional conveyors to which the blanks are delivered after passing the gluing means, an operating shaft, comprising rotatable sections at each end, clutches, one for connecting and disconnecting each of said sections, and operating connections between one of said sections and one of said first-named conveyors and the other section and one of said additional conveyors, said apparatus also comprising switches to be engaged by said blanks on the additional conveyors, and electric circuits including a source of power and means for operating said clutches.

2. Assembling apparatus comprising conveyors each for bearing a stack of blanks to be joined together, one by one from each stack, additional conveyors, one in line with each of the first-named conveyors, to receive the blanks from said stacks, gluing means adjacent one of the additional conveyors, pressing means adjacent the additional conveyors to which the blanks are delivered after passing the gluing means, an operating shaft, comprising rotatable sections at each end, clutches, one for connecting and disconnecting each of said sections, and operating connections between one of said sections and one of said first-named conveyors and the other section and one of said additional conveyors, said clutches having electromagnetic means to engage and disengage same, electric supply circuits with switches therein for said electromagnetic means and members adjacent said additional conveyors for controlling said switches in the circuits of said electromagnetic means.

3. Assembling apparatus comprising conveyors each for bearing a stack of blanks to be joined together, one by one from each stack, additional conveyors, one in line with each of the first-named conveyors, to receive the blanks from said stacks, gluing means adjacent one of the additional conveyors, pressing means adjacent the additional conveyors to which the blanks are delivered after passing the gluing means, an operating shaft, comprising rotatable sections at each end, clutches, one for connecting and disconnecting each of said sections, and operating connections between one of said sections and one of said first-named conveyors and the other section and one of said additional conveyors, said clutches having electromagnetic means to engage and disengage same, electric supply circuits with switches therein for said electromagnetic means and members for controlling said switches in the circuits of said electromagnetic means, said members being disposed adjacent the delivery ends of said additional conveyors.

4. Assembling apparatus comprising conveyors each for bearing a stack of blanks to be joined together, one by one from each stack, additional conveyors, one in line with each of the first-named conveyors, to receive the blanks from said stacks, gluing means adjacent one of the additional conveyors, pressing means adjacent the additional conveyors to which the blanks are delivered after passing the gluing means, an operating shaft, comprising rotatable sections at each end, clutches, one for connecting and disconnecting each of said sections, and operating connections between one of said sections and one of said first-named conveyors and the other section and one of said additional conveyors, said clutches having electromagnetic means to engage and disengage same, electric supply circuits with switches therein for said electromagnetic means and members adjacent said additional conveyors for controlling said switches in the circuits of said electromagnetic means, said members being engageable by said blanks to operate switches in said circuits.

5. Assembling apparatus comprisnig converging supporting means and conveyors for delivering blanks in pairs, one pair at a time from stacks containing the blanks, means for supplying an adhesive to one of said blanks in each pair, pressing rolls at the delivery ends of said conveyors for uniting said blanks, an arresting dog to engage one of said blanks adjacent said rolls, a pawl to hold said dog in arresting position and an arm in position to be actuated by the other blank in each pair to actuate said pawl and release said dog to release the blank arrested thereby, so that said blanks of each pair are delivered in superposed positions to said rolls by said conveyors.

6. Apparatus for uniting blanks of sheet material comprising a conveyor for bearing a stack of display members and a conveyor for bearing a stack of easel members, mechanism for actuating said conveyors, regulating means at the delivery ends of each of said conveyors for engaging said members successively so that the conveyors deliver only one member from each stack at the same point, means for supplying adhesive to one of said members, means at another point for pressing each of said panel and delivery members together to cause the two to adhere, additional conveyors by which said members are transmitted to said adhesive supplying and pressing means, and means to be engaged by said first-named members for controlling the movement of said first-named conveyors and giving said members true position as they arrive at said adhesive supplying means, said actuating means including for each of said first-named conveyors a ratchet, a pawl to engage the ratchet, a shaft for said ratchet, and gearing connecting each shaft one to one end of each of the first-named conveyors, said regulating means comprising pivoted arms carrying rollers one resting against the front of each stack, a shaft above each roller linked to the arm thereof, a segmental gear on each shaft and a toothed disk meshing with each segmental gear, said disk being concentric with said ratchet and movable with respect thereto, and having a recess in its rim receiving said pawl to vary the point of engagement of the ratchet by said pawl.

7. Assembling apparatus comprising conveyors each for bearing a stack of blanks to be joined together, one by one from each stack, additional conveyors, one in line with each of the first-named conveyors, to receive the blanks from said stacks, gluing means adjacent one of the additional conveyors, pressing means adjacent said additional conveyors to which the blanks are delivered after passing the gluing means, an operating shaft, comprising a rotatable section at each end, clutches, one for connecting and disconnecting each of said sections, and operating connections between one of said sections and one of said first-named conveyors and between the other section and one of said additional conveyors, said clutches having electromagnetic means to engage and disengage same, electric circuits for said electromagnetic means, and members adjacent said additional conveyors for controlling the circuits of said electromagnetic means, the first-named conveyors and the additional ones being disposed one above the other, the upper additional conveyor bearing two of said members, and a single member on the other additional conveyor.

8. Assembling apparatus comprising conveyors each for bearing a stack of blanks to be joined together, one by one from each stack, additional conveyors, one in line with each of the first-named conveyors, to receive the blanks from said stacks, gluing means adjacent one of the additional conveyors, pressing means adjacent the additional conveyors to which the blanks are delivered after passing the gluing means, an operating shaft, comprising a rotatable section at each end, clutches, one for connecting and disconnecting each of said sections, and operating connections between each of said sections and one of said first-named conveyors between the other section and one of said additional conveyors, said clutches having electromagnetic means to engage and disengage same, electric circuits for said electromagnetic means, and members adjacent said additional conveyors for controlling the circuits of said electromagnetic means, said members being disposed adjacent the discharge ends of said additional conveyors, the additional conveyors being disposed one above the other, the upper of said additional conveyors bearing one of said members and the other additional conveyor bearing two such members.

References Cited in the file of this patent

UNITED STATES PATENTS

| | | |
|---|---|---|
| 787,730 | Dexter | Apr. 18, 1905 |
| 1,223,398 | Kirkpatrick et al. | Apr. 24, 1917 |
| 1,253,824 | Holmes | Jan. 15, 1918 |
| 1,596,967 | Hansen | Aug. 24, 1926 |
| 1,654,214 | Evans | Dec. 27, 1927 |
| 1,736,407 | Labombarde | Nov. 19, 1929 |
| 1,960,228 | Milmoe | May 22, 1934 |
| 2,248,744 | Cohen | July 8, 1941 |
| 2,255,777 | Jones | Sept. 16, 1941 |
| 2,269,571 | Aktabowski | Jan. 13, 1942 |
| 2,284,563 | Dillman et al. | May 26, 1942 |
| 2,323,673 | Nyberg | July 6, 1943 |
| 2,384,768 | Rau | Sept. 11, 1945 |
| 2,470,017 | Clark | May 10, 1949 |
| 2,511,559 | Banff et al. | June 13, 1950 |
| 2,617,647 | Davis | Nov. 11, 1952 |